(12) United States Patent
Leffelman

(10) Patent No.: US 8,221,816 B1
(45) Date of Patent: Jul. 17, 2012

(54) PROCESS FOR PREPARING LOW MOISTURE FILATA CHEESE

(76) Inventor: Ricky Leffelman, Grantsburg, WI (US)

( * ) Notice: Subject to any disclaimer, the term of this patent is extended or adjusted under 35 U.S.C. 154(b) by 310 days.

(21) Appl. No.: 12/592,190

(22) Filed: Nov. 23, 2009

(51) Int. Cl.
*A23C 19/00* (2006.01)

(52) U.S. Cl. ......... 426/582; 426/518; 426/520; 426/580

(58) Field of Classification Search ............... 426/518, 426/520, 580, 582
See application file for complete search history.

(56) References Cited

U.S. PATENT DOCUMENTS

| | | | |
|---|---|---|---|
| 3,713,220 A | 1/1973 | Kielsmeier et al. | |
| 4,091,721 A | 5/1978 | Cosmi | |
| 4,110,484 A | 8/1978 | Rule et al. | |
| 4,112,835 A | 9/1978 | Mongiello | |
| 4,592,274 A | 6/1986 | Tomatis | |
| 4,898,745 A | 2/1990 | Zamzow et al. | |
| 5,240,724 A | 8/1993 | Otto et al. | |
| 5,249,514 A | 10/1993 | Otto et al. | |
| 5,529,795 A | 6/1996 | Aldrovandi | |
| 5,952,030 A | 9/1999 | Nelles et al. | |
| 5,967,026 A | 10/1999 | Nelles et al. | |
| 6,319,526 B1 * | 11/2001 | Dahlstrom et al. | 426/36 |
| 6,440,481 B1 | 8/2002 | Gascoigne et al. | |
| 6,455,092 B1 | 9/2002 | Begueria | |
| 6,475,538 B2 | 11/2002 | Thakar et al. | |
| 6,998,145 B2 | 2/2006 | Henry et al. | |

\* cited by examiner

*Primary Examiner* — Leslie Wong
(74) *Attorney, Agent, or Firm* — Tipton L. Randall

(57) ABSTRACT

A continuous process for preparing low moisture filata cheese directly from cheese curd includes the following steps: (a) providing a jacketed kneading chamber with a hollow interior, with the chamber having inlet and outlet openings and a pair of hollow auger members rotatably mounted therein between the inlet and outlet openings; (b) passing a heated fluid through the jacket of the kneading chamber and through the hollow auger members; (c) supplying cheese curd with no additional liquid to the hollow interior of the jacketed kneading chamber via the inlet opening therein; (d) rotating the pair of hollow auger members to knead and melt the cheese curd, thereby producing a low moisture filata cheese while transporting the low moisture filata cheese from the inlet opening to the outlet opening of the jacketed kneading chamber; (e) removing the low moisture filata cheese from the jacketed kneading chamber via the outlet opening.

16 Claims, 3 Drawing Sheets

PROCESS FOR PREPARING LOW MOISTURE FILATA CHEESE

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a process and apparatus for preparing pasta filata cheese and, most particularly, to a process and method for preparing low moisture pasta filata cheese without contacting the cheese curd or produced pasta filata cheese with any additional water or water-containing material.

2. Background Information

Pasta filata cheeses are Italian-type cheeses exhibiting a fiber or string-like texture. To make pasta filata cheese, the curd is worked to develop an elasticity in the finished cheese that is desired by consumers. Pasta filata cheeses are kneaded while the cheese curd is in the plastic state to develop this desired string-like texture. The kneading was originally performed by hand, but now is commonly performed by motor driven machines. In one type of machine is a stretcher, in which augers fitted loosely within a trough, stretch and compress cheese curd as the curd is conveyed along the extent of the trough. The stretching develops the fiber or string-like quality for which pasta filata cheeses are valued. The kneading process is conducted at approximately 140° F., which is sufficient to provide plasticity to the cheese but below the melting point of the cheese. At higher temperatures, the fiber structure of the cheese is lost through melting. Presently used processes for producing pasta filata cheese all add hot water or steam directly to the cheese curd to heat the cheese curd during the kneading process.

Once the fiber or string-like structure of the cheese has developed, the warm pasta filata cheese is transferred to a molder/chiller system, which divides the pasta filata cheese into blocks and cools it. The cheese blocks then are transferred to a brine solution in which cold brine chills and floats the blocks to prevent deformation during further cooling. The brine adds some additional water to the filata cheese. The chilling in cold brine also adds some salt to the cheese. When the cheese block center core cools to approximately 45 to 55° F. and has the desired salt content requested by the industry of 1.2-1.7%, it is packaged.

A number of apparatus and processes for preparing pasta filata cheese have been granted patents. For example, Kielsmeier et al., in U.S. Pat. No. 3,713,220, describe an apparatus for mixing cheese curd in contact with heated water. The device includes an elongated auger unit, which extends through a feed hopper for the curd, a water tank, and a cylindrical jacket or tube. The hopper and water tank are filled with heated water, and the auger conveys curd from the hopper through the water tank as the curd is mixed and stretched by the auger. The curd is compressed against the auger by an inclined deflector plate in the tank, and the curd is further compressed as it passes into the cylindrical tube. Additional compression and mixing are caused by a restricting plate at the end of the tube, which restricts the outflow of the curd, thereby creating back pressure in the tube. The curd is prevented from turning with the auger by a longitudinally extending baffle on the deflector plate and by longitudinally extending baffles, which extend radially inwardly from the tube. Control means are provided for maintaining the water at the desired temperature while the curd is being mixed.

In U.S. Pat. No. 4,091,721, Cosmi discloses a vertical hopper that carries a mass of hot water recirculated there through by water jet inlets opening laterally into the vertical hopper below the level of accumulated water. The water jets create water turbulence that heats and mixes cheese curd segments as they pass under gravity through the water toward a pair of intermeshed, slow speed augers within a horizontal discharge duct, which underlies the hopper. The augers feed the uniformly mixed stretched cheese curd through an elbow to a vertical accumulating duct bearing at its upper end an adjustable back pressure plate, which closes off a part of the accumulator duct discharge opening.

Rule et al., in U.S. Pat. No. 4,110,484, describe manufacture of imitation cheese by a flow process from a plurality of edible ingredients. The ingredients include fat, protein, water, and flavor, wherein the cheese product is set by the addition of an acidulant, in lieu of fermentation. The edible ingredients are introduced into an elongated, confined mixing zone in such a way that the acidulant and protein are in distinct and separate flow streams until in the zone, and in the zone are subjected, at a temperature of at least about 100° F., to medium-to-high intensity axial and radial flow mixing. The mixing is continued until a substantially homogeneous mixture is obtained.

In U.S. Pat. No. 4,112,835, Mongiello discloses a fully automatic continuous processing system and apparatus for producing fibrous cheeses of the pizza or mozzarella type, either for immediate consumption or for use in preparing other products. The system is designed in a modular form, such that benefits associated with each component part of the system may be selectively acquired without the need to acquire the entire system itself at one time. Means are provided for milling curd, accumulating the curd and then cooking it, conveying the cooked product to molding means, automatically molding and form cooling the product in apparatus that positively ejects same to a cooling and/or brining bath, salting the cheese product, and automatically vacuum packaging same in known commercial vacuum packing machines for delivery.

Tomatis, in U.S. Pat. No. 4,529,274, describes a machine that continuously produces pasta filata cheese by stretching curds, while adding hot water, then molding the pasta filata obtained into cheese, such as mozzarella, provolone, etc. The curds are sprayed with hot water by nozzles and are pushed by twin augers along a channel into a vertical, substantially cylindrical stretching chamber where a rotating stretching swift having radially projecting, arched paddles stretches the curds into pasta filata against the reaction of a stationary, wall-mounted paddle. This spills over a partition onto other augers that feed the pasta filata to molding means. The molding means preferably comprise a rotating molding drum having surface cavities, against which pasta filata is pushed through apertures in a distributor block. A piston mold mounted on a slide for reciprocating motion between a filling position and a delivery position is also preferably provided as an alternative.

In U.S. Pat. No. 4,898,745, Zamzow et al. disclose a method for making pasta filata cheese which has an extended shelf life. Pasta Filata curd is divided into pieces and the pieces are delivered to an auger conveyor. The curd is heated and worked in the auger conveyor while immersed in hot water to a plastic consistency as it passes through the conveyor. The plastic curd is transported through a steam injection heating zone and a static mixing zone to provide a homogeneous molten curd. The molten curd is transferred from the mixer through a holding conduit into a vacuum chamber so as to flash-cool the molten curd. The holding conduit has a diameter and length sufficient to hold the molten curd for a time and at a temperature which is sufficient to pasteurize and partially sterilize the molten curd. The holding conduit has a particular inner wall surface which is formed of a material with enhanced lubricity and reduced coefficient of friction as compared to stainless steel.

Otto et al., in U.S. Pat. No. 5,240,724, and U.S. Pat. No. 5,249,514, describe a process for producing pumpable foodstuffs, such as raw cheese, which is pre-comminuted, mixed with further ingredients, thermally treated by steam injection, subsequently cooled and creamed or emulsified and then fed or passed to a further working or processing operation. The present invention further relates to an apparatus for producing pumpable foodstuffs, such as processed cheese, having a treatment apparatus for raw foodstuffs, a mixer, a device or unit for heating and subsequently cooling the cheese mass and having feed pumps for the cheese mass.

Aldrovandi, in U.S. Pat. No. 5,529,795, describes a method for extruding the pasta filata cheese in form of a cord that is left hanging up to a belt operated at a speed higher than the speed of the coming out of the cord from an extruding device. The method causes a stretching in the free strap of the cord between the extruding device and the transport belt. The stretched ribbon is then transversely severed in single portions.

In U.S. Pat. No. 5,967,026, Nelles et al. disclose an apparatus and process for producing reduced and low-fat, high-quality pasta filata cheese. The apparatus incorporates a rice-based cheese substitute into freshly manufactured pasta filata cheese through a kneading, spraying process that preserves the integrity of the cheese's fiber structure. The apparatus includes a jacketed kneading chamber with a pair of helical augers that rotate in opposite directions. The kneading chamber includes a hopper at a lower end and an outlet for the cheese solids at an elevated upper end. The jacketed kneading chamber is heated by hot water, but the augers are not disclosed as hollow and heated.

Gascoigne et al., in U.S. Pat. No. 6,440,481, describe a method of making a pasta filata cheese that use equipment and methods typically used in making processed cheese. The method produces a cheese having all of the characteristics of a traditional pasta filata cheese in improved yields and with reduced waste by-products. Pasta filata designates cheeses having a plastic pliable homogeneous stringy structure, and includes such well-know cheeses as mozzarella and provolone. The examples disclosing adding water or steam to the cheese in the cooker.

In U.S. Pat. No. 6,455,092, Begueria discloses a method for making a cheese product by processing an initial substance consisting of a cheese. The method includes the following steps: a) thermal and mechanical treatment such as stirring the initial cheese fractionated into pieces, at a temperature less than 60° C. to break down the initial cheese protein structure in a limited way; b) cooling the mixture of step a) to a temperature less than 50° C. to start building up the protein structure and to constitute a stable emulsion of fats with the initial cheese other constituents; c) if required, mechanically treating the paste obtained at b) in a worm device to complete the building up of the protein structure and stabilize the emulsion; and d) shaping the paste resulting from step c). Steps a) and b) are carried out by adding to the initial cheese product a mixture comprising an emulsifying and chelating agent of calcium and sorbic acid or a salt thereof. Limited details of the equipment used in the process are provided.

Thaker et al., in U.S. Pat. No. 6,475,538 describe an improved process of producing natural mozzarella cheese. The process starts with a liquid dairy substrate that is cultured and coagulated. The resulting curd is cut and salted. The resulting curd (i.e., base curd) may be frozen or refrigerated and stored until needed. Once needed, the stored base curd is ground and treated in a blender, where it is partially standardized to form a "partially standardized base curd." The partially standardized base curd is then cooked in a cooker or cooker/stretcher (preferably in a lay-down cooker) where standardization is completed by the addition of a cultured or uncultured skim milk retentate. No emulsifying salts are used in the cooker/stretcher. The cheese mass is then rapidly cooled to produce the mozzarella cheese. The conventional brine cooling step normally used in mozzarella cheese production is not used in the present invention. In an especially preferred embodiment, starch is also added to the standardized, cooked, stretched mozzarella prior to the cooling step. Such starch is typically added at a level of up to about 10 percent of the finished product and, more preferably, at a level of about 0.1 to about 2 percent. The added starch serves to bind the moisture in the product and results in a firmer cheese, which is easier to shred.

In U.S. Pat. No. 6,998,145, Henry et al. disclose an improved method for making cheese. The method includes pasteurizing and acidifying one or more dairy components to obtain a cheese diary product. The cheese dairy product is coagulated to form a coagulum comprising curd and whey. The coagulum is cut and the whey is removed therefrom, thereby leaving the curd. The curd is heated and kneaded to produce a fibrous mass. An extender is added to the curd or to the fibrous mass, and the extender comprises at least one source of fat. The fibrous mass is processed to produce a cheese product. By this method, the casein/fat ratio is increased so that less fat is wasted through removal with the whey. The fat content of the cheese product can then be increased later in the process through the use of the extender, thereby creating a more cost-effective product.

Applicant has devised a waterless cooker device for carrying out a continuous process of preparing low moisture filata cheese directly from cheese curd, without adding any additional liquid to the cheese curd entering the continuous process.

SUMMARY OF THE INVENTION

The invention is a continuous process for preparing low moisture filata cheese directly from cheese curd without adding additional liquid. The continuous process comprises the following steps: (a) providing a jacketed kneading chamber with a hollow interior, with the chamber having inlet and outlet openings and a pair of hollow auger members rotatably mounted therein between the inlet and outlet openings. (b) passing a heated fluid through the jacket of the kneading chamber and through the hollow auger members. (c) supplying cheese curd, with no additional liquid, to the hollow interior of the jacketed kneading chamber via the inlet opening therein. (d) rotating the pair of hollow auger members to knead and melt the cheese curd, thereby producing a low moisture filata cheese, while transporting the low moisture filata cheese from the inlet opening to the outlet opening of the jacketed kneading chamber. (e) removing the low moisture filata cheese from the jacketed kneading chamber via the outlet opening.

In a preferred embodiment of the continuous process of the present invention, the heated fluid passing through the jacket of the kneading chamber and through the hollow auger members of step (b) has temperatures between about 140° F. and 170° F. The pair of hollow auger members of step (d) rotate between about 6 and 11 revolutions per minute, and the low moisture filata cheese removed from the jacketed kneading chamber via the outlet opening of step (e) has a water content of about 46% to about 53%.

DESCRIPTION OF THE EMBODIMENTS

| | Nomenclature |
|---|---|
| 10 | Waterless Cheese Cooker Device |
| 20 | Jacketed Kneading Chamber |
| 22 | Fluid Inlets for Kneading Chamber |
| 24 | Fluid Outlets for Kneading Chamber |
| 26 | Cheese Curd Inlet of Kneading Chamber |
| 28 | Filata Cheese Outlet of Kneading Chamber |
| 30 | Hollow Auger Member |
| 32 | Hollow Auger Member |
| 34 | Fluid Inlets for Auger Members |
| 36 | Fluid Outlets for Auger Members |
| 38 | Spiral Vanes of Auger Members |
| 40 | Drive Motor for Auger Members |
| 42 | Drive Chain for Auger Members |
| 44 | Drive Gears of Auger Members |
| 50 | Fluid Heater |
| 60 | Pump for Fluid |
| 70 | Fluid Reservoir |
| 80 | Control Panel |
| 90 | Fluid Transport Lines |
| 95 | Hopper for Cheese Curds |

Construction

The invention is a continuous process for preparing low moisture filata cheese directly from cheese curd without adding additional liquid. The continuous process comprises the following steps: (a) providing a jacketed kneading chamber with a hollow interior, the chamber having inlet and outlet openings and a pair of hollow auger members rotatably mounted therein between the inlet and outlet openings. (b) passing a heated fluid through the jacket of the kneading chamber and through the hollow auger members. (c) supplying cheese curd, with no additional liquid, to the hollow interior of the jacketed kneading chamber via the inlet opening therein. (d) rotating the pair of hollow auger members to knead and melt the cheese curd, thereby producing a low moisture filata cheese, while transporting the low moisture filata cheese from the inlet opening to the outlet opening of the jacketed kneading chamber. (e) removing the low moisture filata cheese from the jacketed kneading chamber via the outlet opening.

In a preferred embodiment of the continuous process of the present invention, the heated fluid passing through the jacket of the kneading chamber and through the hollow auger members of step (b) has temperatures between about 140° F. and 170° F. The pair of hollow auger members of step (d) rotate between about 6 and 11 revolutions per minute, and the low moisture filata cheese removed from the jacketed kneading chamber via the outlet opening of step (e) has a water content of about 46% to about 53%.

Figure 1:
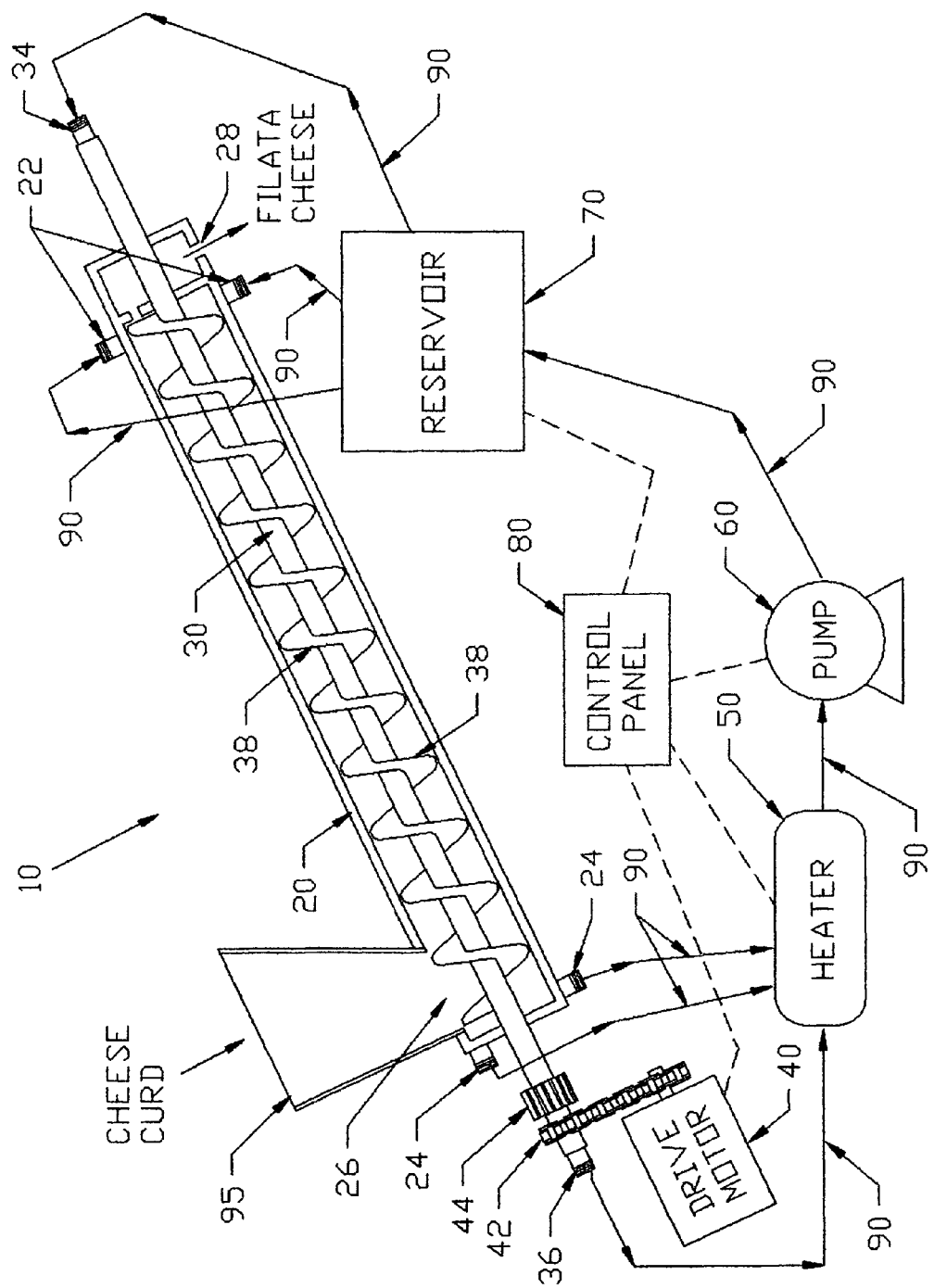
FIG. 1 is a schematic view of the waterless cheese cooker device of the present invention with the jacketed kneading chamber shown in cross section.

Referring now to FIG. 1, a schematic representation of the waterless cheese cooker device 10 is illustrated, with the jacketed kneading chamber 20 having a hollow interior, an inlet opening 26 and an outlet opening 28, and a pair of hollow auger members 30, 32 rotatably mounted within the kneading chamber 20 between the inlet and outlet openings 26, 28. The jacketed kneading chamber 20 is shown in cross section in FIG. 1. The cooker device 10 includes an electric drive motor member 40, operatively connected to the pair of hollow auger members 30, 32, to provide rotation thereto. Preferably, the electric drive motor member 40 includes a drive chain 42 connected to one of the hollow auger members 30. The auger members 30, 32 also each include a meshed gear 44, so that rotation of one auger member 30 in one direction, clockwise for example, provides rotation of the other auger member 32 in an opposite direction, counter clockwise for example. The spiral vanes 38 of the auger members 30, 32 do not intermesh so no interference between the auger members 30, 32 occurs should one auger member become disabled. The jacketed kneading chamber 20 is preferably positioned in an inclined orientation, with the chamber outlet 28 elevated relative to the chamber inlet 26.

Heating fluid, such as water or steam, flows from the heater 50 to a pump 60 and on to a reservoir 70, via fluid transport lines 90. The heating fluid is directed to the elevated end of the jacketed kneading chamber 20 where upper and lower heating fluid ports 22 provide entry of the fluid into the jacketed chamber 20. Heating fluid also flows from the reservoir 70 to a fluid inlet 34 that feeds the elevated ends of both hollow auger members 30, 32, also via fluid transport lines 90. The heating fluid passes downwardly through the jacketed kneading chamber 20 and the hollow auger members 30, 32 to provide even heating of the cheese curd within the jacketed kneading chamber 20. At the lower end of the waterless cheese cooker device 10, two outlets 24 from the jacketed kneading chamber 20 and one outlet 36 from both hollow auger members 30, 32 are connected to the heater 50 via fluid transport lines 90 to return cooled heating fluid thereto. A control panel 80 is connected to the drive motor 40, heater 50, pump 60 and reservoir 70 to control and monitor the various processing parameter involved in operation of the waterless cheese cooker device 10.

Figure 2:
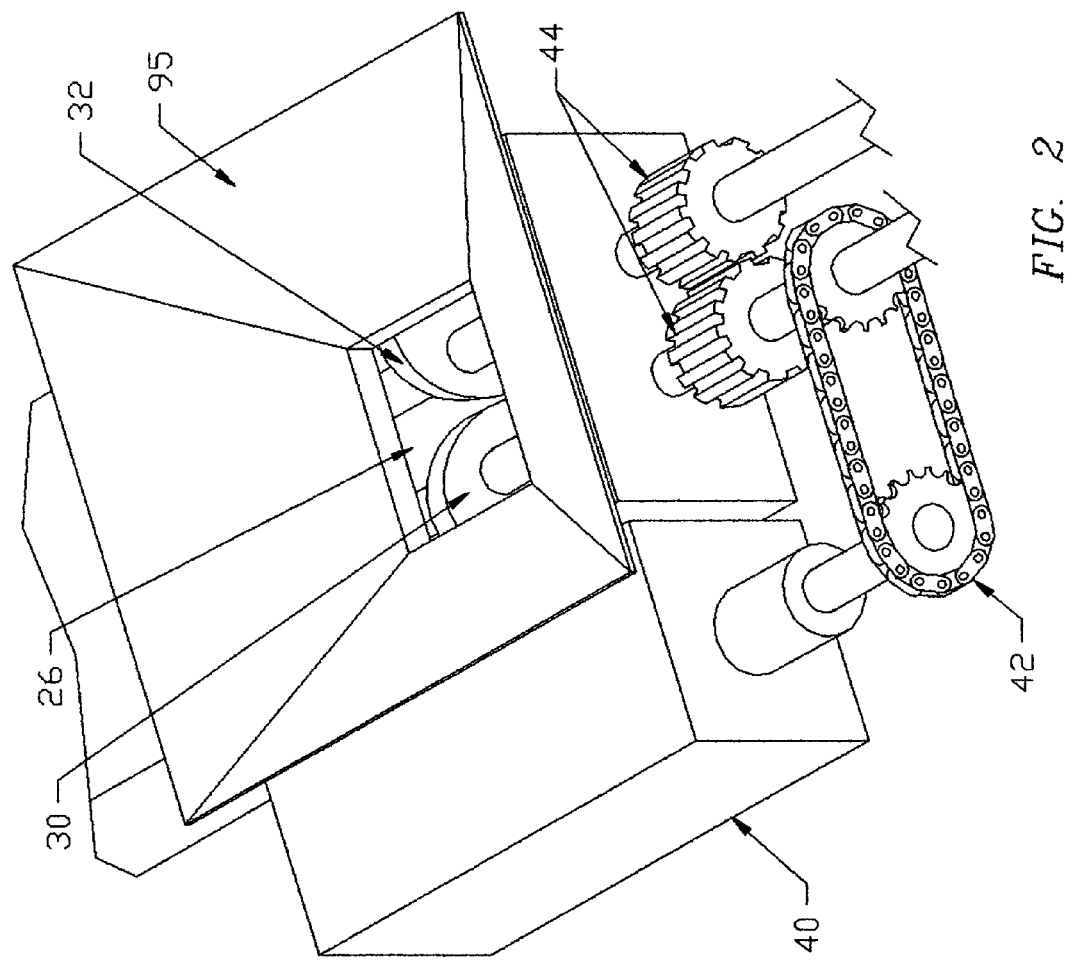
FIG. 2 is a perspective top view of the inlet of the jacketed kneading chamber of the present invention.
Figure 3:
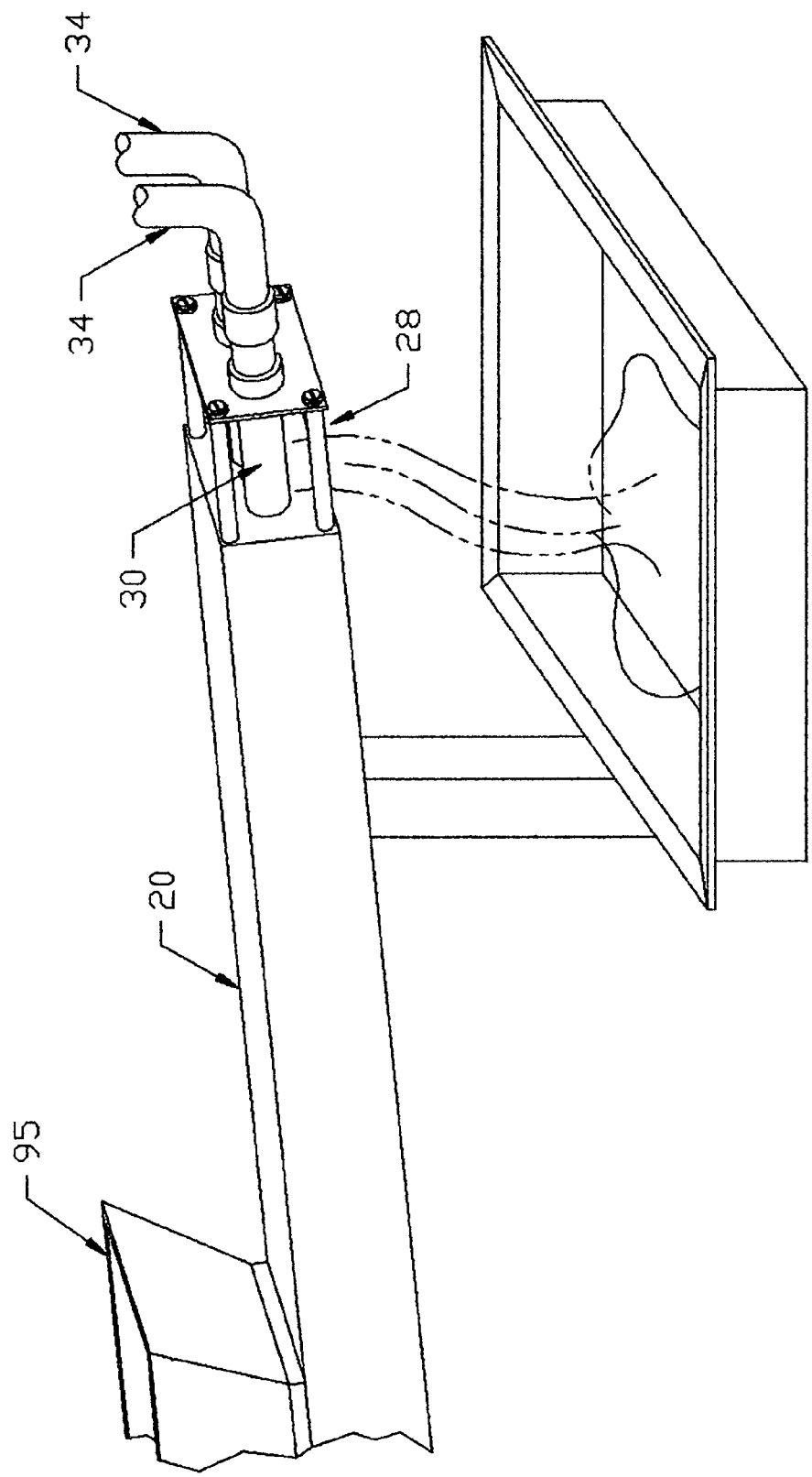
FIG. 3 is a perspective view of the outlet of the jacketed kneading chamber of the present invention.

In operation, cheese curd is continuously added to the inlet 26 of the jacketed kneading chamber 20 via a tapered hopper device 95 attached thereto. A top view of the hopper device 95 and jacketed kneading chamber 20 with auger members 30, 32 mounted therein is shown in FIG. 2. The cheese curd is stretched, kneaded and heated by the auger members 30, 32 as it travels through the heated, jacketed kneading chamber 20 to the outlet 28 thereof. The resulting filata cheese flows from the outlet 20 into a suitable container, as illustrated in FIG. 3. The cheese curds are converted directly to filata cheese within the cheese cooker device 10 without addition of any liquid. Further, a non-liquid component can be added to the cheese curds in the kneading chamber 20 to provide a component added, low moisture filata cheese product.

Preferably, the kneading chamber 20 and hollow auger members 30, 32 maintain the cheese solids at a temperature between about 140° F. and 170° F. during passage through the cooker device 10. In addition, the hollow auger members 30, 32 preferably rotate between about 6 and 11 revolutions per minute, and the low moisture filata cheese removed from the jacketed kneading chamber 20 via the outlet opening 28 preferably has a water content of about 46% to about 53%.

In a further embodiment of the invention, at least one non-liquid component is added to the cheese curd that is continuously supplied to the hollow interior of the jacketed kneading chamber 20 via the inlet opening 26 therein. The non-liquid component is dispersed throughout the cheese curd as it passes through the kneading chamber 20 where the curd is converted to filata cheese. The further embodiment of the continuous process produces an added component, low moisture filata cheese that exist the jacketed kneading chamber 20 via the outlet opening 28. The at lease one non-liquid component can include various flavoring materials, such as herbs, spices and seasonings, that provide desirable properties to the filata cheese, as determined by consumers. Other non-liquid components may include cured meats or similar materials.

While the invention has been particularly shown and described with reference to preferred embodiments thereof, it will be understood by those skilled in the art that various changes in form and details may be made therein without departing from the spirit and scope of the invention.

I claim:

1. A continuous process for preparing low moisture filata cheese directly from cheese curd comprising the steps;
    (a) providing a jacketed kneading chamber with hollow interior, the chamber having inlet and outlet openings and a pair of hollow auger members rotatably mounted therein between the inlet and outlet openings;
    (b) passing a heated fluid through the jacket of the kneading chamber and through the hollow auger members;
    (c) supplying cheese curd with no additional liquid to the hollow interior of the jacketed kneading chamber via the inlet opening therein;
    (d) rotating the pair of hollow auger members to knead and melt the cheese curd, thereby producing a low moisture filata cheese while transporting the low moisture filata cheese from the inlet opening to the outlet opening of the jacketed kneading chamber; and
    (e) removing the low moisture filata cheese from the jacketed kneading chamber via the outlet opening.

2. The continuous process for preparing low moisture filata cheese directly from cheese curd of claim 1, wherein the heated fluid passing through the jacket of the kneading chamber and through the hollow auger members of step (b) has temperatures between about 140° F. and 170° F.

3. The continuous process for preparing low moisture filata cheese directly from cheese curd of claim 1, wherein the pair of hollow auger members of step (d) rotate between about 6 and 11 revolutions per minute.

4. The continuous process for preparing low moisture filata cheese directly from cheese curd of claim 1, wherein the low moisture filata cheese removed from the jacketed kneading chamber via the outlet opening of step (e) has a water content of about 46% to about 53%.

5. The continuous process for preparing low moisture filata cheese directly from cheese curd of claim 1, wherein the inlet opening of the jacketed kneading chamber is elevated relative to the outlet opening thereof.

6. The continuous process for preparing low moisture filata cheese directly from cheese curd of claim 1, further including after step (c) the step;
    ($c_1$) adding at least one non-liquid component to the cheese curd supplied to the hollow interior of the jacketed kneading chamber via the inlet opening therein;
    thereby producing an added component, low moisture filata cheese in step (e).

7. A continuous process for preparing low moisture filata cheese directly from cheese curd comprising the steps;
    (a) providing a jacketed kneading chamber with hollow interior, the chamber having inlet and outlet openings and a pair of hollow auger members rotatably mounted therein between the inlet and outlet openings;
    (b) passing a heated fluid having a temperature between about 140° F. and 170° F. through the jacket of the kneading chamber and through the hollow auger members;
    (c) supplying cheese curd with no additional liquid to the hollow interior of the jacketed kneading chamber via the inlet opening therein;
    (d) rotating the pair of hollow auger members to knead and melt the cheese curd, thereby producing a low moisture filata cheese while transporting the low moisture filata cheese from the inlet opening to the outlet opening of the jacketed kneading chamber; and
    (e) removing the low moisture filata cheese from the jacketed kneading chamber via the outlet opening.

8. The continuous process for preparing low moisture filata cheese directly from cheese curd of claim 7, wherein the pair of hollow auger members of step (d) rotate between about 6 and 11 revolutions per minute.

9. The continuous process for preparing low moisture filata cheese directly from cheese curd of claim 7, wherein the low moisture filata cheese removed from the jacketed kneading chamber via the outlet opening of step (e) has a water content of about 46% to about 53%.

10. The continuous process for preparing low moisture filata cheese directly from cheese curd of claim 7, wherein the inlet opening of the jacketed kneading chamber is elevated relative to the outlet opening thereof.

11. The continuous process for preparing low moisture filata cheese directly from cheese curd of claim 7, further including after step (c) the step;
    ($c_1$) adding at least one non-liquid component to the cheese curd supplied to the hollow interior of the jacketed kneading chamber via the inlet opening therein;
    thereby producing an added component, low moisture filata cheese in step (e).

12. A continuous process for preparing low moisture filata cheese directly from cheese curd comprising the steps;
    (a) providing a jacketed kneading chamber with hollow interior, the chamber having inlet and outlet openings and a pair of hollow auger members rotatably mounted therein between the inlet and outlet openings;
    (b) passing a heated fluid having a temperature between about 140° F. and 170° F. through the jacket of the kneading chamber and through the hollow auger members;
    (c) supplying cheese curd with no additional liquid to the hollow interior of the jacketed kneading chamber via the inlet opening therein;
    (d) adding at least one non-liquid component to the cheese curd supplied to the hollow interior of the jacketed kneading chamber via the inlet opening therein;

(e) rotating the pair of hollow auger members to knead and melt the cheese curd, thereby producing a low moisture filata cheese while transporting the low moisture filata cheese from the inlet opening to the outlet opening of the jacketed kneading chamber; and (f) removing the added component, low moisture filata cheese from the jacketed kneading chamber via the outlet opening.

13. The continuous process for preparing low moisture filata cheese directly from cheese curd of claim 12, wherein the heated fluid passing through the jacket of the kneading chamber and through the hollow auger members of step (b) has temperatures between about 140° F. and 170° F.

14. The continuous process for preparing low moisture filata cheese directly from cheese curd of claim 12, wherein the pair of hollow auger members of step (d) rotate between about 6 and 11 revolutions per minute.

15. The continuous process for preparing low moisture filata cheese directly from cheese curd of claim 12, wherein the low moisture filata cheese removed from the jacketed kneading chamber, via the outlet opening of step (e), has a water content of about 46% to about 53%.

16. The continuous process for preparing low moisture filata cheese directly from cheese curd of claim 12, wherein the inlet opening of the jacketed kneading chamber is elevated relative to the outlet opening thereof.

* * * * *